United States Patent

[11] 3,561,572

| [72] | Inventors | Helmut Flegl |
| | | Stuttgart-Zuffenhausen; |
| | | Hans Mezger, Ludwigsburg, Germany |
| [21] | Appl. No. | 804,849 |
| [22] | Filed | Mar. 6, 1969 |
| [45] | Patented | Feb. 9, 1971 |
| [73] | Assignee | Firma Dr. Ing. h.c.F. Porsche K.G. |
| | | Stuttgart-Zuffenhausen, Germany |
| [32] | Priority | Mar. 8, 1968 |
| [33] | | Germany |
| [31] | | P 31 039 |

[54] DEVICE FOR MOUNTING FRICTION LINING CARRIERS IN DISK BRAKE ASSEMBLIES
4 Claims, 2 Drawing Figs.

[52] U.S. Cl. ................................................ 188/73.6
[51] Int. Cl. ................................................ F16d 65/02
[50] Field of Search ................................................ 188/73, 73CL, 205.3

[56] References Cited
UNITED STATES PATENTS
| 3,255,848 | 6/1966 | Harrison.................... | 188/73 |
| 3,298,468 | 1/1967 | Buyze........................ | 188/73 |

FOREIGN PATENTS
| 875,158 | 8/1961 | Great Britain............... | 188/73 |

Primary Examiner—George E. A. Halvosa
Attorney—Craig, Antonelli, Stewart & Hill

ABSTRACT: Apparatus for mounting friction lining carriers of disk brake assemblies, particularly for use in automotive vehicles, including readily removable means for supporting the carriers and the friction linings secured thereto, in a stationary position relative to the brake caliper structure, within a recess provided in said caliper structure.

PATENTED FEB 9 1971  3,561,572

Inventors:
HELMUT FLEGL
HANS MEZGER

By: Craig, Antonelli, Stewart & Hill
ATTORNEYS:

3,561,572

DEVICE FOR MOUNTING FRICTION LINING CARRIERS IN DISK BRAKE ASSEMBLIES

BACKGROUND OF THE INVENTION

The present invention relates to apparatus for mounting and supporting the friction lining carriers of disc brake assemblies, particularly those employed in automotive vehicles, wherein the carriers are supported within a recess in the brake caliper structure and removably secured in a fixed relationship therewith, thereby securing the carriers, and the friction linings attached thereto, from radial motion with respect to the brake disc. In conventional disc brake assemblies, the friction lining carrier members are commonly secured, in a fixed relationship relative to the brake caliper structure, by means of retaining pins inserted through a portion of the brake caliper structure and through appropriately positioned bores provided within a backing plate of the carrier member. After the friction linings have been attached to the carrier members, the retaining pins may be secured against axial displacement by means of conventional spring clips, keys, cotter pins, etc.

By virtue of this conventional arrangement, disassembly of the disc brake assembly, for example, for purposes of replacement of the friction linings, is extremely cumbersome and time-consuming, even for highly-skilled workmen. Accordingly, repair and replacement of parts requiring disassembly are expensive. Further, in addition to the cost attributable to the time-consuming process for accomplishing disassembly and reassembly, there are certain circumstances, particularly pertaining to racing vehicles, where the time required for replacing worn friction linings is, in itself, critical.

Accordingly, it is an object of the present invention to provide relatively simple apparatus for mounting the friction lining carrier members within the brake caliper structure in a manner wherein they may be rapidly removed and replaced.

Further, it is an object of the present invention to provide readily detachable mounting means for friction lining carrier members within the brake caliper structure of a disc brake assembly, which can be simply and inexpensively constructed. Finally, it is an object of the present invention to provide mounting apparatus of the type described hereinabove, which apparatus is adaptable to be incorporated within existing conventional disc brake assemblies.

SUMMARY OF THE INVENTION

The foregoing objects are accomplished, in accordance with the present invention, by the provision of a recess within the brake caliper structure and a U-shaped mounting bracket having leg portions adapted to be inserted within aligned bores provided for mounting purposes in the upper portions of the friction lining carrier members and the brake caliper structure. In the assembled position, the leg portions of the mounting bracket extend, substantially parallel to the rotational axis of the brake disc, radially outwardly of the periphery of the rotary disc. The base portion of the U-shaped mounting bracket, which serves to connect the leg portions thereof, is adapted to be received, in the assembled condition, within a spring detent secured to a surface of the brake caliper structure. The spring detent, formed by a profiled spring band, for example, of spring steel, includes a flange portion through which it is secured, by conventional means, to a mounting surface of the brake caliper structure extending at an angle with respect to a plane within which the leg portions of the mounting bracket lie. The detent formed by the profiled spring band is biased with respect to the base portion of the mounting bracket.

The mounting arrangement constructed in the manner summarized herein and described in detail below facilitates removal of worn friction linings and replacement of new ones with relatively few manipulations requiring no auxiliary tools. Further, as will be come more apparent from the detailed description which follows, the construction in accordance with the present invention is such that it may be incorporated in existing conventionally constructed disc brake systems with a relatively few simple alterations.

BRIEF DESCRIPTION OF THE DRAWINGS

The foregoing objects, features and advantages of the present invention will become more readily apparent from a consideration of the detailed description hereinbelow, when the considered in conjunction with the accompanying drawings, wherein.

DETAILED DESCRIPTION OF THE DRAWINGS

Figure 1:
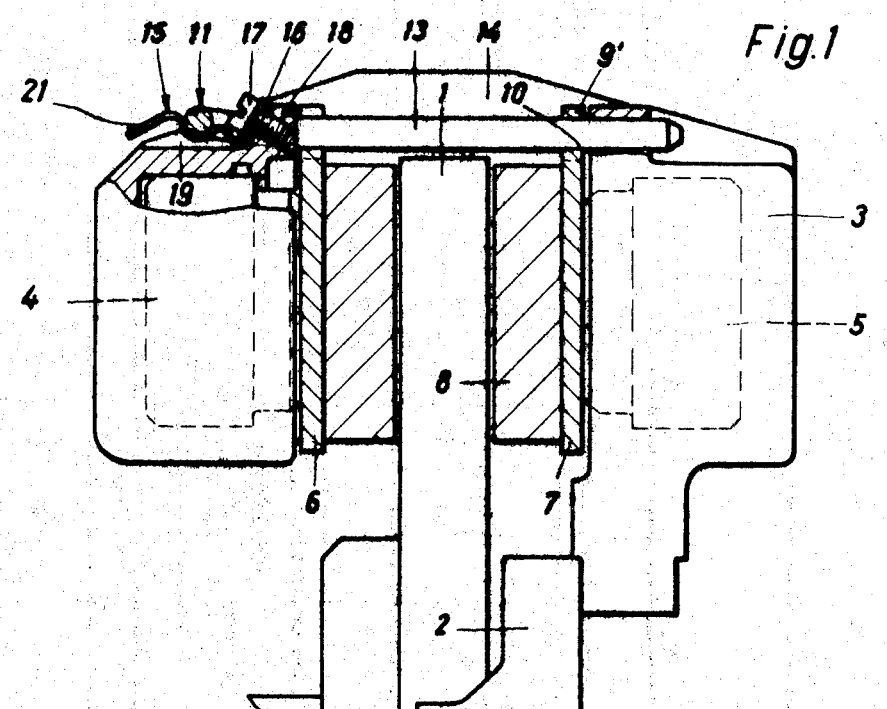
FIG. 1 represents a sectional view through a part of a disc brake assembly for an automotive vehicle, particularly illustrating the details of the mounting of the friction lining carrier members and the friction linings attached thereto.
Figure 2:
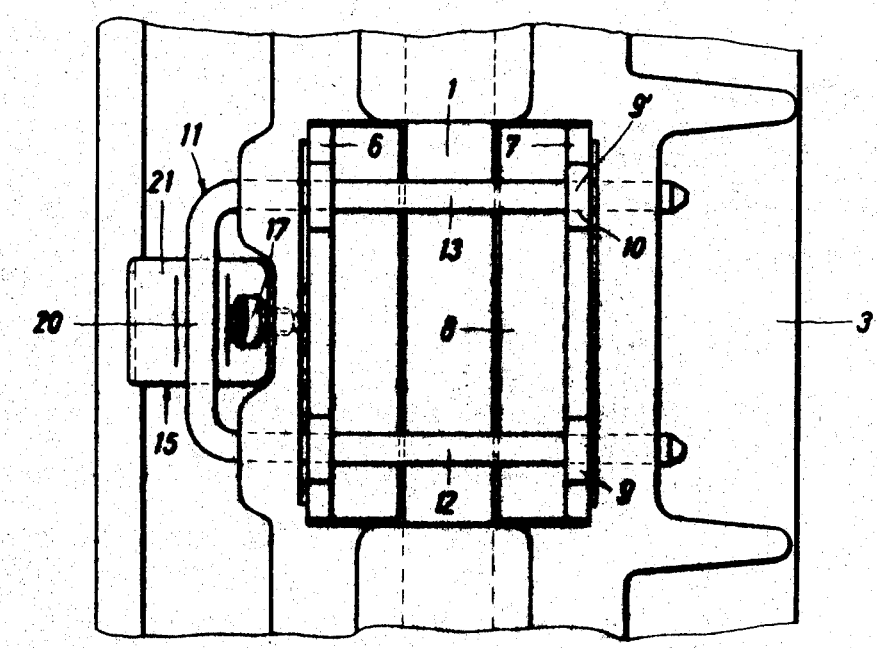
FIG. 2 represents a top view of the partial disc brake assembly of FIG. 1.

A brake disc 1 is connected, in a conventional manner, with a rotating part of the vehicle wheel. A brake caliper structure 3, attached, by conventional means, to a flange 2 so as to be stationary relative to brake disc 1, surrounds disc 1. Hydraulically loaded pistons 4 and 5 are incorporated within brake caliper structure 3 and are adapted to cooperate with friction-lining carrier members 6 and 7 upon selective actuation of the brake control member. Friction linings 8 are detachably secured upon friction-lining carrier members 6 and 7 such that the linings 8 are positioned relative to brake disc 1 so as to engage in frictional contact with disc 1 upon selective actuation of the brake control member (not shown).

Mounting bosses 9 and 9' are provided on each of the friction-lining carrier members 6 and 7 as extensions spaced apart along one edge surface of the carrier members 6 and 7. Bores 10 are provided within bosses 9 and 9' and are dimensioned appropriately to receive therethrough the leg portions 12 and 13 of a mounting bracket 11 constructed in the form of a U-shaped pin.

In the assembled condition, the leg portions 12 and 13 of mounting bracket 11 extend through aligned bores 10 in each of friction lining carrier members 6 and 7 as well as additional bores aligned therewith provided with the upper portion of brake caliper structure 3. Thus assembled, leg portions 12 and 13 extend, substantially parallel to the rotational axis of brake disc 1, radially outwardly of the peripheral surface of brake disc 1 and serve to support friction-lining carrier members 6 and 7, constraining said carrier members 6 and 7 from radial motion relative to brake disc 1.

A recess 14 is provided within brake caliper structure 3 and facilitates introduction of friction-lining carrier members 6 and 7, with friction linings 8 secured thereto, into a mounting orientation.

Mounting bracket 11 is detachably secured against axial displacement by means of a spring detent 15 adapted for engagement with the base portion 20 thereof. Spring detent 15 is constructed in the form of a corrugated spring steel band and includes a flange portion 16 having a mounting aperture provided therein. A bearing surface 18 is provided on brake caliper structure 3 and includes a threaded bore adapted to receive a threaded fastener 17, by means of which the flange portion 16 of spring detent 15 is secured to brake caliper structure 3. Bearing surface 18 preferably extends at an angle with respect to the axis of bores 9 and 9'.

Spring detent 15 is constrained from motion is a circumferential direction by the limits of a groove 19 provided at the circumferential portion of brake caliper structure 3. When assembled, base portion 20 of mounting bracket 11 is held firmly by the bias of spring detent 15 within a concave depression formed therein.

In order to disassemble the friction disc brake assembly constructed in accordance with the illustrated embodiment of the present invention, tongue portion 21 of spring detent 15 may easily be depressed manually, thus permitting mounting bracket 11 to be axially withdrawn. After the leg portions 12 and 13 of mounting bracket 11 have been removed from the aligned bores, friction-lining carrier members 6 and 7 can be removed through recess 14 of the brake caliper structure 3. Replacement of the friction-lining carrier members 6 and 7, with new friction linings 8 attached thereto, may easily and rapidly be conducted analogously, in reverse order. As mentioned above, the disassembly and reassembly of the friction-lining carrier members, constructed in accordance with the present invention, can be accomplished without resort to any auxiliary tools.

While the present invention has been described hereinabove with specific reference to a single embodiment thereof, it is to be understood that the scope of the present invention is not limited thereto, but is susceptible of numerous changes and modifications as would be obvious to one with normal skill in the pertinent technology.

We claim:

1. Apparatus for detachably supporting friction-lining carrier members within a disc brake assembly, particularly for use in automotive vehicles, comprising:

brake disc means secured for rotation with a vehicle wheel;

brake caliper structure means secured to a part of a vehicle which is fixed relative to said brake disc means, said caliper structure means defining a recess extending laterally to both sides of said brake disc means, and including securing means;

friction-lining carrier members having one surface thereof adapted for selectively detachable engagement of friction brake linings thereon, said friction-lining carrier members further including attachment means;

mounting bracket means constructed in the form of a U-shaped pin adapted for simultaneous engagement with said securing means of said brake caliper structure means and said attachment means of said friction-lining carrier members, said securing means and said attachment means defining two sets of aligned apertures spaced apart in parallel relationship, the distance between said two sets of aligned apertures being substantially equal to the spacing between two free leg portions of said U-shaped mounting bracket means; and spring detent means attached to said brake caliper structure means and biased to engage with said mounting bracket means to retain same in engagement with said brake caliper structure means, said spring detent means including an undulated spring steel band adapted for flush mounting upon a surface of said brake caliper structure means, wherein said spring detent means further includes a depression positioned to engage with a cross member of said U-shaped mounting bracket member which connects said two free leg portions thereof.

2. Apparatus according to claim 1, wherein said spring detent member includes a mounting flange and said brake caliper structure means includes a mounting surface adapted for flush engagement with said flange of said spring detent means, said mounting surface lying within a plane which intersects a plane containing the axes of said two sets of aligned apertures.

3. Apparatus according to claim 2, wherein said spring detent means further includes a tongue portion which may be depressed, by external means, to overcome the normal bias of said spring detent means, thus permitting the removal of the leg portions of said U-shaped mounting bracket means from said aligned apertures.

4. Apparatus according to claim 3, wherein said brake caliper structure means includes a second recess, of relatively shallow dimension, in the region thereof adapted to receive said spring detent means, said second recess including lateral walls positioned so as to constrain said spring detent means from rotational displacement when said spring detent means is secured upon said mounting surface of said brake caliper structure means.